United States Patent [19]

Hirahara et al.

[11] Patent Number: 5,063,498
[45] Date of Patent: Nov. 5, 1991

[54] DATA PROCESSING DEVICE WITH DIRECT MEMORY ACCESS FUNCTION PROCESSED AS AN MICRO-CODE VECTORED INTERRUPT

[75] Inventors: Ziro Hirahara, Yokohama; Akihito Abe, Kawasaki, both of Japan

[73] Assignee: Kabushiki Kaisha Toshiba, Kawasaki, Japan

[21] Appl. No.: 383,266

[22] Filed: Jul. 20, 1989

Related U.S. Application Data

[63] Continuation of Ser. No. 29,764, Mar. 24, 1987, abandoned.

[30] Foreign Application Priority Data

Mar. 27, 1986 [JP] Japan ............................ 61-69215

[51] Int. Cl.$^5$ .................... G06F 13/28; G06F 9/22; G06F 13/24
[52] U.S. Cl. .................. 395/425; 364/242.3; 364/262.8; 364/957.1; 364/946.6; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 4,090,238 | 5/1978 | Russo | 364/200 |
| 4,133,030 | 1/1979 | Huettner et al. | 364/200 |
| 4,458,313 | 7/1984 | Suzuki et al. | 364/200 |
| 4,532,587 | 7/1985 | Roskell et al. | 364/200 |
| 4,648,029 | 3/1987 | Cooper et al. | 364/200 |
| 4,716,523 | 12/1987 | Burrus, Jr. et al. | 364/200 |
| 4,729,090 | 3/1988 | Baba | 364/200 |

*Primary Examiner*—Thomas C. Lee
*Assistant Examiner*—Ken S. Kim
*Attorney, Agent, or Firm*—Finnegan, Henderson, Farabow, Garrett, and Dunner

[57] ABSTRACT

In this data processing device, a request for direct memory-access operation is detected as an interrupt signal. When such an interrupt is detected, a interrupt controller generates a vector corresponding to the interrupt sigal. On the basis of this vector, a DMA controller generates a control signal showing whether the interrupt signal is a normal interrupt or an interrupt for requesting the direct memory-access operation. A CPU includes a ROM for storing micro-code for achieving the direct memory-access operation. When the DMA controller generates a control signal corresponding to the interrupt signal, the CPU sequentially reads out the micro-codes, to execute the direct memory-access operation. Specifically, if an interrupt for requesting the direct memory-access operation is detected, different processing space from that used for a normal interrupt processing is accessed. The processing space has a prestorage of the data corresponding to the data stored in various types of registers provided in the conventional DMA controller. By using this data, the data transfer is controlled by the micro-codes.

5 Claims, 4 Drawing Sheets

DATA PROCESSING DEVICE WITH DIRECT MEMORY ACCESS FUNCTION PROCESSED AS AN MICRO-CODE VECTORED INTERRUPT

This application is a continuation of application Ser. No. 07/029,764, filed Mar. 24, 1987, now abandoned.

BACKGROUND OF THE INVENTION

This invention relates to a data processing device which is fabricated on a single semiconductor chip and which can have direct access to a memory.

In the field of electronic computers, direct memory-access (DMA) has been known as a method of transferring data at high speed.

FIG. 1 shows a block diagram of a conventional computer system with the DMA function, for example, a micro computer system. The system comprises central processing unit (CPU) 71 and a direct memory-access controller (DMAC) 72. The system further comprises a read/write memory 73, an I/0 interface 74, a data bus 75, and an address bus 76.

In this system, DMAC 72 renders a DMA-request signal DREQ active to transfer data from memory 73 to I/0 interface 74 by using the DMA function. By this active signal, the right to use the bus is requested of CPU 71. Then, CPU 71 renders a DMA acknowledge signal DACK active. The bus-use right is transferred to DMAC 72. Subsequently, DMAC 72 addresses memory 73 and I/0 interface 74. A read control signal RD is made active for memory 73. A write control signal WR is made active for I/0 interface 74. As a result, data is read out from memory 73 and written into I/0 interface 74. By performing the sequence of operations a designated number of times, the DMA data transfer is executed between memory 73 and I/0 interface 74.

When a specially designed hardware such as DMAC 72 is used, the DMA data transfer does not need the fetching of instructions by CPU 71 or the decoding of instructions. Hence, the DMA data transfer system can transfer data at a speed several times higher than in the normal program processing achieved by CPU 71. Such an operation, however, needs the special hardware of DMAC 72, as has been just mentioned.

The recent trend is that the whole microcomputer is fabricated into a single semiconductor chip. DMAC 72 needs many functional components: a source address register for storing an address of the data to transfer, a destination address register for storing an address to which the data will be transferred to, a transfer counter register for storing the number of data transfers, an incrementor for incrementing the contents of the source address register and the destination address register, a decrementor for decrementing the contents of the source address register and the destination address register, and an interface with the CPU, for example. Therefore, if the DMAC is ,formed in a single chip, the microcomputer contains more hardware, inevitably increasing the chip size and the manufacturing cost.

If software, not hardware, is used for realizing the DMA function, much time must be taken for fetching the instructions of the software program, and for decoding these instructions. This makes the data transfer speed extremely slow.

SUMMARY OF THE INVENTION

Accordingly, an object of this invention is to provide a data processing device which can have a direct access to a memory and can realize the high speed DMA data transfer with a relatively small hardware increase.

According to the present invention, there is provided a data processing device comprising: interrupt detect means for detecting an interrupt signal and for generating a vector corresponding to the interrupt signal detected; control signal generating means for generating, in response to the vector, a control signal showing whether or not the interrupt is a normal interrupt or an interrupt for requesting the direct memory-access operation; logical operation processing means for storing the control function as micro-codes to achieve the direct memory access operation, and for sequentially reading out the micro-codes when the control signal generating means generates a control signal corresponding to the interrupt signal requesting the direct memory-access operation, whereby the logical operation processing means executes and controls the direct memory-access operation; and parameter memory means for storing parameters necessary for the direct memory-access operation, and for reading out these parameters in response to the vector to supply them to the logical operation processing means.

DETAILED DESCRIPTION OF THE PREFERRED EMBODIMENTS

Figure 1:
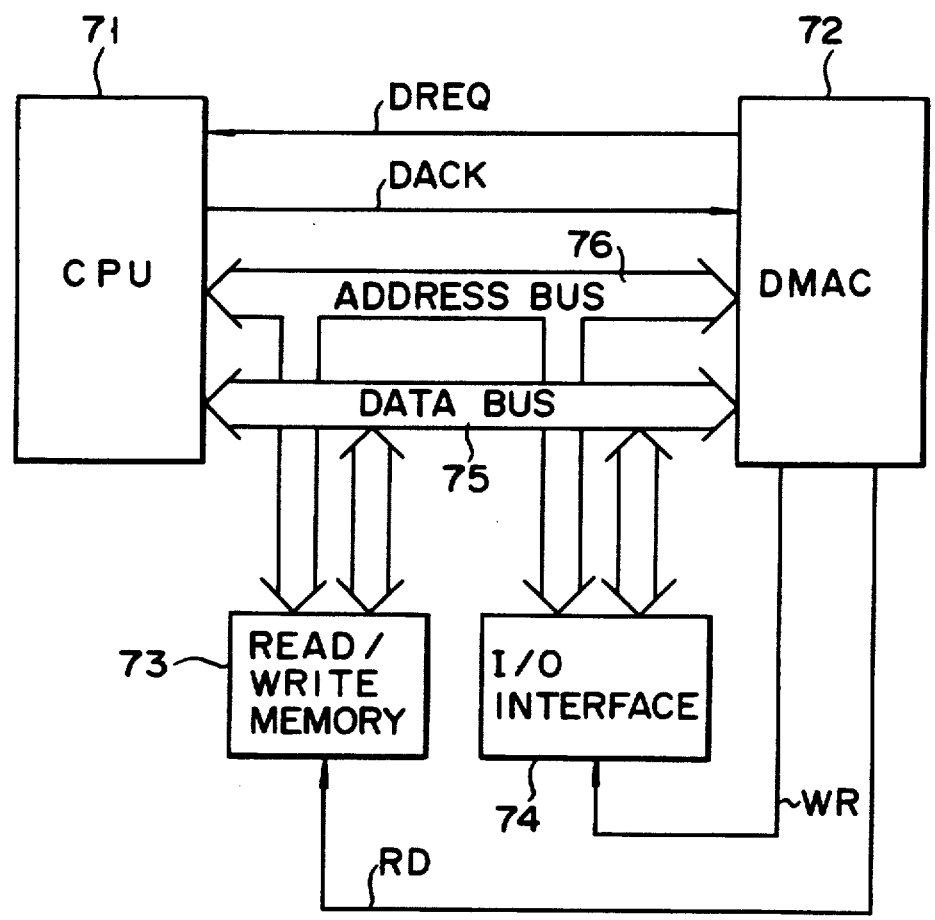
FIG. 1 is a block diagram of a configuration of a conventional electronic computer system.
Figure 2:
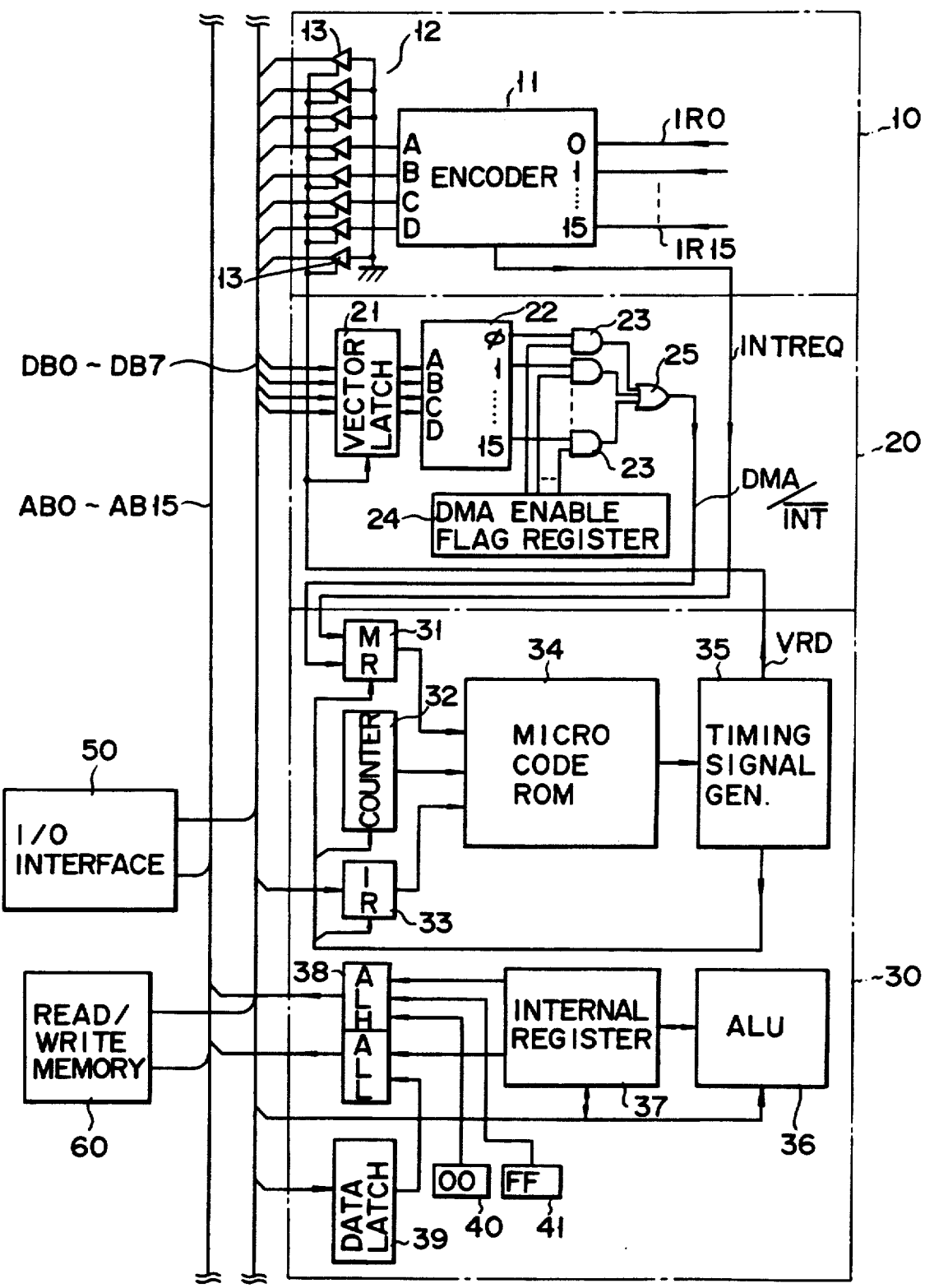
FIG. 2 is a block diagram illustrating a configuration of a data processing device according to an embodiment of this invention.

FIG. 2 shows a block diagram illustrating a data processing device according to this invention. As is shown in the figure, the device comprises 8-bit data buses DB0 to DB7 and 16-bit address buses AB0 to AB15. The device further comprises an interrupt controller 10, a DMA controller 20, and a CPU 30. These components are all integrated into a single chip. Data buses DB0 to DB7 and address buses AB0 to AB15 are connected to an I/0 interface 50 and a read/write memory 60.

Interrupt controller 10 contains an encoder 11 coupled with sixteen interrupt signal lines IR0 to IR15. Interrupt states of these sixteen signal lines IR0 to IR15 are encoded into a vector made up of binary signals A to D of 4 bits. When an interrupt is present in any one of signal lines IR0 to IR15, an interrupt request signal INTREQ is generated by encoder 11 and applied to CPU 30.

Interrupt controller 10 contains a vector converter 12, which is for converting the 4-bit vector made of signals A to D output from encoder 11 into an 8-bit vector. Vector converter 12 is made up of eight transfer gates 13. Of the eight transfer gates 13, those of the lower three bits are supplied with the ground potential corresponding to "0" of data. Those of the 4th bits to the 7th bits are supplied with binary signals A to D. The ground potential corresponding to the data "0" is supplied to the 8th bit as the most significant bit (MSB). In response to vector read signal VRD (described later), transfer gates 13 produce the data as input thereto, to convert the 4-bit data into 8-bit data. The converted 8-bit vector (hereinafter referred to as "V", and expressed in hexadecimal notation) is output to data buses DB0 to DB7.

DMA controller 20 is provided wit a vector latch circuit 21 for latching binary signals A to D of 4 bits output from encoder 11, which are contained in the vector "V" output onto data buses DB0 to DB7. Vector latch circuit 21 latches this vector in response to vector read signal VRD. The vector made up of signals A to D is supplied to decoder 22. Decoder 22 converts the vector consisting of four bits binary signals A to D into 16 signals 0 to 15. These sixteen signals are applied to first input terminals of sixteen AND gates 23, which are provided in DMA controller 20. DMA controller 20 further contains DMA enable flag register 24 for latching 16-bit data. The 16-bit data to be latched in DMA enable flag register 24 is preset corresponding to the interrupt by sixteen interrupt signal lines IR0 to IR15. For example, if the interrupt is a normal interrupt, "0" is latched as a flag. If the interrupt is an interrupt for requesting the DMA operation "1" is latched as the flag. The 16-bit flag data latched in DMA enable flag register 24 is supplied to respective second input terminals of sixteen AND gates 23. The outputs of sixteen AND gates 23 are supplied to OR gate 25 in a parallel fashion. OR gate 25 outputs control signal DMA/$\overline{\text{INT}}$ for deciding whether the interrupt signal as input to interrupt controller 10 is a normal interrupt or an interrupt for requesting the DMA operation. Control signal DMA/$\overline{\text{INT}}$ is supplied to CPU 30.

CPU 30 comprises a mode register (MR) 31, counter a 32, an instruction register (IR) 33, a micro-code ROM 34, a timing signal generator 35, an arithmetic/logic unit (ALU) 36, a program counter PC (not shown), an internal register 37, an address latch 38, a data latch 39, and latches 40 and 41. Micro-code ROM 34 stores microcodes. This ROM 34 is addressed by the outputs of mode register 31, counter 32, and instruction register 33, and produces the micro-code from the addressed memory location. The micro-code as read out from micro-code ROM 34 is supplied to timing signal generator 35. In response to the supplied microcode, timing signal generator 35 generates various types of timing signals for controlling the operation of the whole device. Arithmetic/logic unit 36 executes arithmetic and logical operations. Internal register 37 is made up of various counters and registers such as program a status word PSW (not shown). Address latch 38 is composed of upper an address latch ALH for latching the addresses of upper the 8 bits on address bus AB0 to AB15, and a lower address latch ALL for latching the addresses of the lower 8 bits. Data latch 39 latches the data on data buses DB0 to DB7. Latch 40 latches the data of hexadecimal "00". Latch 41 latches the data of hexadecimal "FF".

Mode register 31 is supplied with interrupt request signal INTREQ, which is generated by interrupt controller 10, and control signal DMA/$\overline{\text{INT}}$, which is generated by DMA controller 20. These signals are both stored in mode register 31.

Micro-code ROM 34 stores the programs as microcodes for controlling the operation of the whole device. This program include the microprogram for executing and controlling the normal processing and the normal interrupt processing, and also the microprogram for executing and controlling the DMA operation.

Timing signal generator 35 generates, in response to the micro-code read out from micro-code ROM 34, various types of timing signals including vector read signal VRD.

Figure 3:
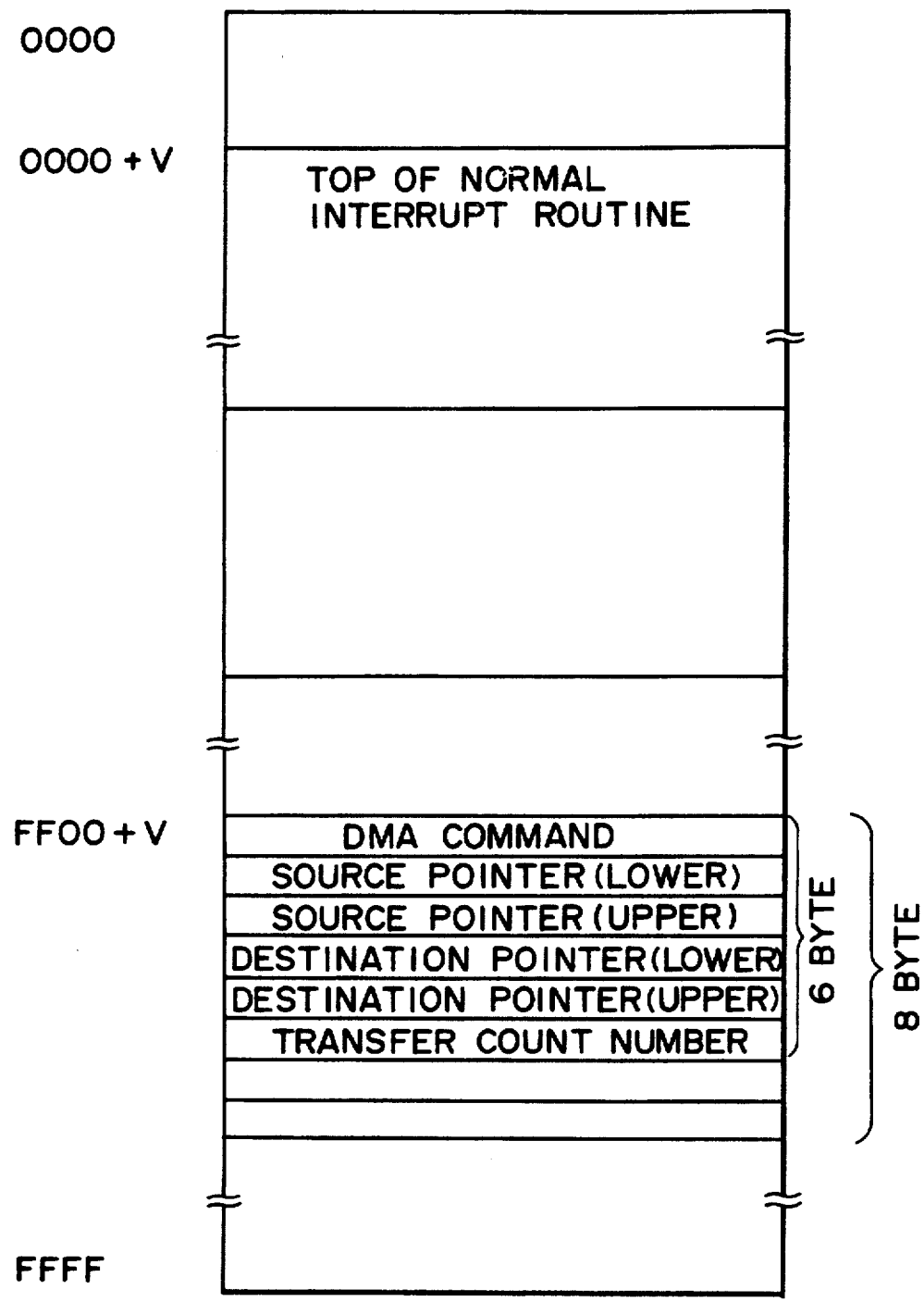
FIG. 3 shows a data memory map of a data area to which the data processing device is accessible.

FIG. 3 shows a data memory map of a data area accessible to which the data processing device. is accessible. The data area contains I/O interface 50 and memory 60. This data area is sized such that it is defined by the addresses of hexadecimal "0000" to "FFFF". The area having address "0000"+"V" as the top address is included in memory 60. In this area, the processing program for the normal interrupt routine is stored. The area starting at address "FF00"+"V" is included in memory 60. The DMA command is stored in the 1st byte of the 8-byte area starting at address "FF00"+"V". This command contains many parameters. The first parameter designates if a DMA transfer is the 1-byte transfer or a 2-byte transfer. The second parameter indicates if the content of the source pointer indicating the data area of the data transfer source is incremented or decremented every data transfer, or left unchanged. The third parameter indicates if the content of the destination pointer indicating the data area of the data transfer destination is incremented or decremented every data transfer, or left unchanged. The second byte location stores the lower order bits of the source pointer. The third byte location stores the upper order bits of the source pointer. The fourth byte location stores the lower order bits of the destination pointer. The fifth byte location stores the upper order bits of the destination pointer. The sixth byte location stores the transfer count number equal to the maximum number of data transfers. No data is stored in the seventh and eighth bytes for the reason ,that the address designated by vector "V" is divisible by eight.

The operation of the data processing device thus arranged will be described. After the whole device is reset, the execution of a predetermined program as stored in memory 60 starts. At this time, if an interrupt request is generated from a peripheral device (not shown), one of 16 interrupt signal lines IR0 to IR15 is made active. Assuming now that interrupt signal line IR1, for example, is made active, the encoder 11 in interrupt controller 10 executes the encode in which, of those four bits output signals A to D, only signal A is set to "1". Additionally, signal INTREQ is made active. This signal INTREQ is loaded into mode register 31 in CPU 30. Then, micro-code ROM 34 is addressed by the output signal of mode register 31 with that signal INTREQ stored. By the addressing, the micro-code as stored in the address memory location of the ROM 34 is read out. Upon receipt of the read out micro-code, timing signal generator 35 produces vector read signal VRD.

Figure 4:
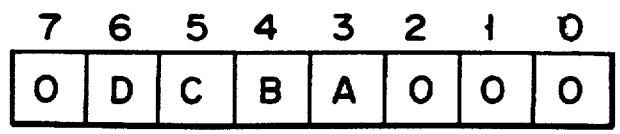
FIG. 4 shows a data format used in the data processing device.

FIG. 4 shows a format of vector "V". In response to signal VRD, each transfer gate 13 of vector converter 12 in interrupt controller 10 operates, vector "V" is output onto data buses DB0 to DB7. In the vector, the 0th to second bits, and the seventh bit are fixed to "0". The third bit to sixth bit are used as output data A to D and output from encoder 11. The third bit of the vector "V" is set to "1". This is "08" of hexadecimal number.

Vector "V" is input to DMA controller 20 via data buses DB0 to DB7. In response to signal VDR, the data from the third bit to the sixth bit of vector "V", i.e., signals A to D, are latched into vector latch circuit 21. The latched data is converted by decoder 22 to make only one of the sixteen output signals active. When the interrupt signal line IR1 is used as an interrupt signal line for requesting the DMA operation, the flag data of the DMA enable flag register 24, which corresponds to signal line IR1, is set to "1". As a result, the output signal of AND gate 23 to which the signal made active by decoder 22 is supplied, is "1". In turn, the output signal DMA/INT of OR gate 25 is made active.

When signal DMA/INT is made active, micro-code ROM 34 is addressed by the output signal from mode register 31 in CPU 30. The micro-code is read out from the memory area as addressed. This micro-code is the top of the micro-code for executing and controlling the DMA operation.

The vector "V" output from interrupt controller 10 is also input to CPU 30, by way of data buses DB0 to DB7. This vector "V" is temporarily stored in internal register 37 in response to the timing signal from timing signal generator 35. The vector "V" as stored in internal register 37, is then transferred to lower order address latch ALL of address latch circuit 38. Then, it is latched by this latch. The data "FF" latched by latch circuit 41 is transferred to upper order address latch ALH of address latch circuit 38. Then, it is latched by this latch. At this point, address "FF00"+"V" is latched into address latch circuit 38. Then, this address is output to address buses AB0 to AB15. This address signal sequentially reads out the data and address value, i.e., DMA command, source pointer, destination pointer, and transfer count number, which are necessary for the DMA operation as prestored with 6 bytes length in the memory area of memory 60. The memory area is contained in the data area and has "FF00"+"V" as the top address. The data and address values contain the DMA command, the source pointer, the destination pointer, and the transfer count number. For details, reference is made to FIG. 3. The read out data are sent to internal register 37 in CPU 30. Subsequently, the DMA operation, which is based on the read out data and address value, is executed under control of the micro-codes as prestored in micro-code ROM 34 in CPU 30. The addressing of micro-code ROM 34 is performed at this time by the output signal from counter 32. Following the execution of the DMA transfer, CPU 30 updates the data and address value for the DMA operation, such as the source pointer or the destination pointer, and the transfer count number. These updated values are again stored in the original data area of memory 60/. The operation similar to the above is performed again. Such an operation is repeated several times until the transfer count number stored at the 6th byte in the data area starting at address "FF00"+"V" is zero. At this time, CPU 30 decides that the DMA transfer is completed, and stops the DMA transfer operation.

In another case, one of interrupt signal lines IR1 to IR15 is rendered active, and the interrupt signal requests the normal interrupt. In this case, the data latched in DMA enable flag register 24 corresponding to this interrupt is set to "0". As a result, the output signal from AND gate 23, which has been supplied with the signal made active by decoder 22, is "0". Then, the output signal DMA/INT of OR gate 25 is made nonactive. When the signal DMA/INT is nonactive, the micro-code as read out from micro-code ROM 34 is located at the top of the program for executing the normal interrupt. In this case, the vector "V" from internal register 37 is sent to lower order address latch ALL of address latch circuit 38. The data "00" latched in latch circuit 40 is sent to the upper order address latch ALH of address latch circuit 38, and latched therein. In this way, address "0000"+"V" is latched in address latch circuit 38. This address is then output onto address buses AB0 to AB15. By this address signal, the normal interrupt routine is read out from the memory area of memory 60 starting at address "0000"+"V", which is contained in the data area of FIG. 3. The interrupt routine as read out is executed in the conventional way.

Figure 5:
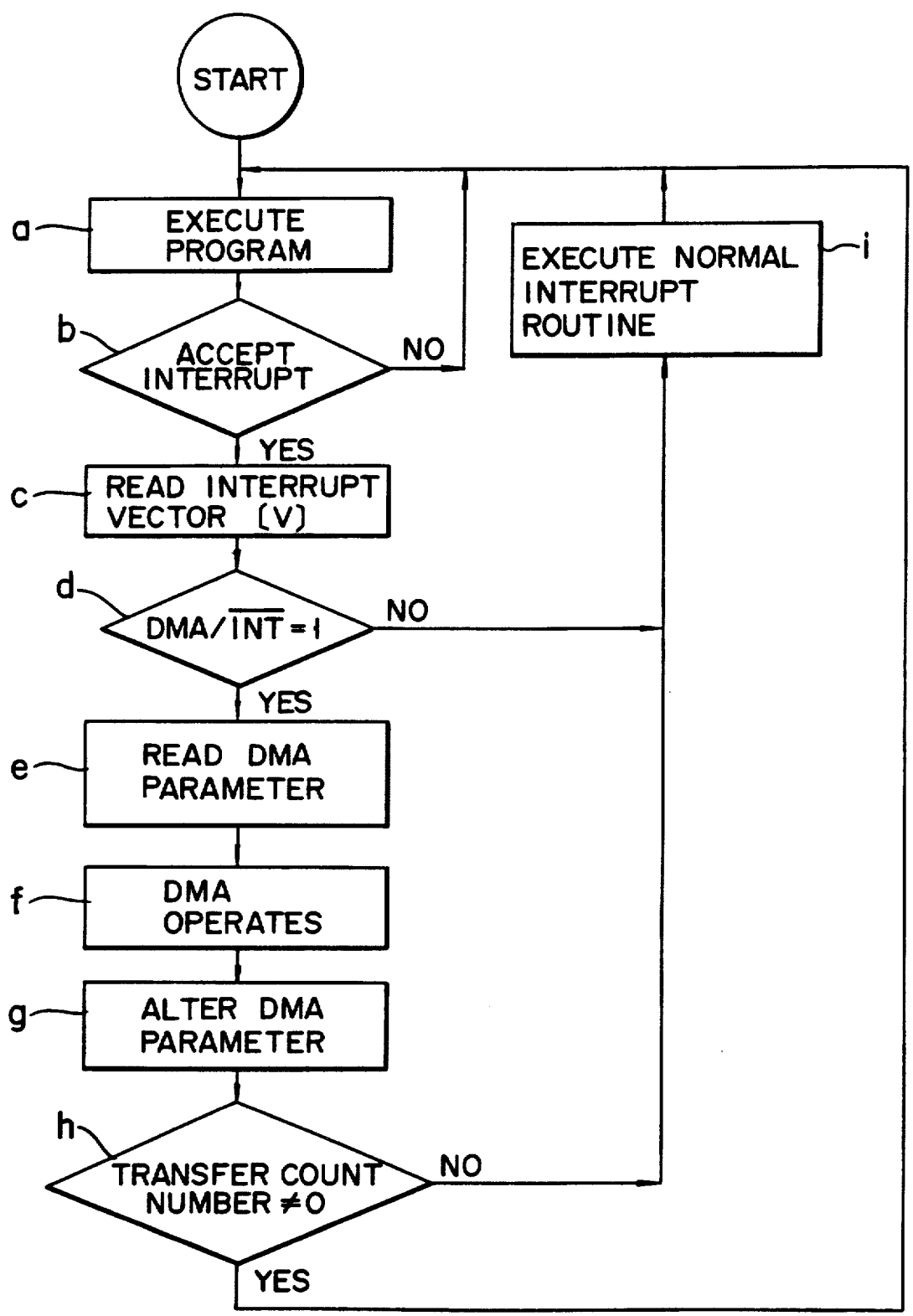
FIG. 5 shows a flowchart illustrating the operation of the data processing device.

The process flow as mentioned above is illustrated in FIG. 5. The whole data processing device is first reset. A predetermined program prestored in memory 60 is executed (step "a"). A check is made as to whether or not the data processing device accepts an interrupt from the peripheral device (step "b"). The detection of the interrupt accept is performed depending on whether or not the interrupt request signal INTREQ is generated in interrupt controller 10. If the interrupt is rejected, control goes back to step "a" where execution of the program is continued. When the interrupt is detected in step "b", vector "V" is read out (step "c"). Following the read out of vector "V", it is checked whether or not the control signal DMA/INT as generated by DMA controller 20 is "1" or not (step "d"). If the condition is true and the interrupt is the one for requesting the DMA transfer, the DMA parameter is read out from the memory area at "FF00"+"V" in the data area (step "e").

After the reading out of DMA parameter, the DMA transfer is executed by using the parameter (step "f"). The details of the DMA transfer follow. In the case of the DMA transfer to and from the memory 60, the contents in the memory address location as indicated by source pointer within the 6-byte length starting at address "FF00"+"V" in FIG. 3, are transferred to internal register 37 in CPU 30, and temporarily stored therein. This is a read-cycle. The data stored in internal register 37 is transferred to the location at the address as indicated by the destination pointer with the 6-byte length, and stored in this memory location. This is a write-cycle. In the 2-byte transfer, such an operation is repeated two times.

Every time the 1-byte transfer or the 2-byte transfer is ended, the source pointer and the destination pointer are altered according to the DMA command, if necessary. Further, the transfer counter number is decremented by "1", to change the DMA parameter (step "g"). After this, it is determined whether or not the transfer counter number in the DMA parameter is "0" (step "h"). In this step, if the transfer count number is not 0, control returns to step "a" since the DMA transfer is not yet completed.

When in step "d⇌ it is detected that signal DMA/INT is "0" and the interrupt is for requesting the normal interrupt, the program counter (PC) and the program status word (PSW) are pushed into a system stock. A program is read out from the memory location at address "0000"+"V" in the data area, so that the normal interrupt is processed (step "i").

If step "h" detects that the transfer counter number is "0", CPU decides that the DMA transfer has been ended and executes step "i". As a result, the end of the DMA transfer can be detected by CPU 30. Subsequently, the normal interrupt is processed, so that the processing is executed using the data as obtained through the DMA transfer.

As seen from the foregoing, the data processing device according to this invention is realized by additionally applying DMA controller 20 to the conventional data processing device with the data interrupt function. With this hardware feature, the function of the prior DMAC is realized by using the micro-codes in micro-code ROM 34 and the stored data in the data area.

The hardware used for the whole data processing device can remarkably be reduced when compared with the prior device using the DMAC dedicated for the DMA transfer. Specifically, the data processing device of this invention needs the hardware increased by an amount necessary for storing the data for the DMA interrupt processing by DMA controller 20 and micro-code ROM 34. This increase of hardware is much smaller than that due to use of the dedicated DMAC.

The DMA transfer speed is controlled by the micro-codes read out from micro-code ROM 34. Therefore, it is slightly slower than that when the dedicated DMAC is used, but can be remarkably improved when compared with that in the case of the interrupt processing by the program processing.

It will be apparent to those skilled in the art that various modifications and variations could be made of the invention without departing from the scope or spirit of the invention as recited in the appended claims.

What is claimed is:

1. A data processing device allowing a direct memory-access operation to be performed between a read/write memory and an I/O interface, said data processing device comprising:
    interrupt detecting means for detecting an interrupt signal and for generating a vector corresponding to the detected interrupt signal;
    control signal generating means for generating, in response to said vector, a control signal indicating whether said interrupt signal is a normal interrupt signal or a direct memory-access interrupt signal;
    logical operation processing means, having a ROM storing micro-code instructions for executing a normal operation, a normal interrupt operation, and a direct memory-access operation, for sequentially reading out the micro-code instructions in order to control the execution of the normal operation and the normal interrupt operation, and for sequentially reading out the micro-code instructions in order to control the execution of the direct memory access operation when a control signal is generated by said control signal generating means in accordance with the interrupt signal requesting the direct memory access operation; and
    parameter memory means for, upon the execution of said direct memory-access operation, storing parameters for use by said logical operation processing means, for reading said parameters responsive to said vector, and for supplying said parameters to said logical operation processing means.

2. A data processing device according to claim 1, wherein said control signal generating means includes a register for storing data indicating whether said interrupt signal is a normal interrupt or an interrupt for requesting the direct memory-access operation, and data select means for selecting the data of said register in response to said vector.

3. The data processing device according to claim 1, wherein said parameter memory means stores a command, a data transfer source address, a data transfer destination address, and a data transfer number, used when said direct memory-access operation is executed by said logical operation processing means.

4. The data processing device according to claim 3, wherein said data transfer source address, said data transfer destination address, and said data transfer number stored in said parameter memory means are updated under control of said logical operation processing means.

5. The data processing device according to claim 1, wherein said parameter memory means includes a read/write memory.

* * * * *

UNITED STATES PATENT AND TRADEMARK OFFICE
CERTIFICATE OF CORRECTION

PATENT NO. : 5,063,498
DATED : November 05, 1991
INVENTOR(S) : Ziro Hirahara et al.

It is certified that error appears in the above-identified patent and that said Letters Patent is hereby corrected as shown below:

Abstract, line 5, change "sigal" to --signal--.

Abstract, line 9, after "ROM", delete "for".

Absract, line 15, before "different" insert "a".

Signed and Sealed this

First Day of June, 1993

Attest:

MICHAEL K. KIRK

Attesting Officer

Acting Commissioner of Patents and Trademarks